US007353225B2

(12) United States Patent
Dada

(10) Patent No.: US 7,353,225 B2
(45) Date of Patent: Apr. 1, 2008

(54) MECHANISM FOR COMPARING CONTENT IN DATA STRUCTURES

(75) Inventor: Aditya Dada, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 721 days.

(21) Appl. No.: 10/294,713

(22) Filed: Nov. 13, 2002

(65) Prior Publication Data

US 2004/0093347 A1 May 13, 2004

(51) Int. Cl.
*G06F 17/30* (2006.01)
*G06F 17/21* (2006.01)

(52) U.S. Cl. ............... 707/6; 707/101; 707/102; 707/203; 715/500.1; 715/511; 715/513

(58) Field of Classification Search ............ 707/6, 707/101, 203, 102; 715/500.1, 511, 513
See application file for complete search history.

(56) References Cited

U.S. PATENT DOCUMENTS

| | | | | |
|---|---|---|---|---|
| RE35,861 E | * | 7/1998 | Queen | 715/511 |
| 5,956,726 A | * | 9/1999 | Aoyama et al. | 707/102 |
| 6,502,112 B1 | * | 12/2002 | Baisley | 715/513 |
| 6,526,410 B1 | * | 2/2003 | Aoyama et al. | 707/102 |
| 6,658,626 B1 | * | 12/2003 | Aiken | 715/526 |
| 6,757,675 B2 | * | 6/2004 | Aiken et al. | 707/3 |
| 6,839,714 B2 | * | 1/2005 | Wheeler et al. | 707/102 |
| 2003/0145278 A1 | * | 7/2003 | Nielsen | 715/511 |

OTHER PUBLICATIONS

Java World Fueling Innovation entitled, "Mapping XML to Java, Part 1, Employ the SAX API to map XML documents to Java objects", by Robert Hustead, (pp. 1-34), http://www.javaworld.com/javaworld/jw-08-2000/jw-0804-sax_p.html, Aug. 2000.
Java World Fueling Innovation entitled, "Mapping XML to Java, Part 2, Create a class library that uses the SAX API to map XML documents to Java objects", by Robert Hustead, dated, (pp. 1-35), http://www.javaworld.com/javaworld/jw-10-2000/jw-1006-sax_p.html, Oct. 2000.

* cited by examiner

*Primary Examiner*—Khanh B. Pham
(74) *Attorney, Agent, or Firm*—Hickman Palermo Truong & Becker LLP; Christopher J. Brokaw

(57) ABSTRACT

A mechanism is provided for automatically comparing content in a plurality of data structures. In one embodiment, this mechanism does not perform a literal, line-by-line comparison of the data structures. Instead, the mechanism first extracts the content from the data structures. The mechanism then substantively compares the extracted content. By extracting the content first and then substantively comparing the content, the mechanism eliminates the problems associated with a literal, line-by-line comparison of the data structures. As a result, the mechanism enables content comparison to be performed automatically, and enables improved comparison results to be achieved.

36 Claims, 5 Drawing Sheets

```
<TESTCASE>
    <TESTID> ID VALUE </TESTID>
    <STATUS> STATUS VALUE </STATUS>
</TESTCASE>
```

⋮

```
<TESTCASE>
    <TESTID> ID VALUE </TESTID>
    <STATUS> STATUS VALUE </STATUS>
</TESTCASE>
```

FIG. 2

MECHANISM FOR COMPARING CONTENT IN DATA STRUCTURES

FIELD OF THE INVENTION

This invention relates generally to computing technology, and more particularly to a mechanism for comparing content in data structures.

BACKGROUND

In many implementations, the output of a computer operation or process takes the form of an XML (Extensible Markup Language) document. For example, in the software testing arena, it is common for the results of a set of tests to be provided as an XML document. An example of such a document is as follows:

```
<Testcase>
    <TestID> 1 </TestID>
    <Status> Passed </Status>
</Testcase>
    .
    .
    .
<Testcase>
    <TestID> n </TestID>
    <Status> Failed </Status>
</Testcase>
```

In this document, the results of the tests are described and delimited by XML tags (e.g. Testcase, TestID, and Status). Based on the tags, it can be ascertained that there were a plurality of test cases, and that the test case with test ID "1" passed and the test case with test ID "n" failed.

In a typical testing scenario, a set of tests is run not on just one platform but on a plurality of different platforms. For each platform, one of the above documents is typically generated, setting forth the test cases that were run on that platform and the results of each test case. As a result, after a set of tests is run on a plurality of platforms, a plurality of the above documents is usually generated.

Often, it is desirable to compare the test results across the plurality of documents to derive an overview of the test results. Such an overview can provide valuable information. For example, if a particular test case is failing across all platforms, then it may indicate that there is something wrong with the test case itself. This and other useful information can be derived from the overview. Unfortunately, comparing results across multiple documents is not easy; hence, this overview is difficult to derive.

One method that has been used to try to derive the overview is to run a "diff" utility on the plurality of documents. A diff utility performs a literal, line-by-line comparison between two documents and provides as output a list of all of the differences between the documents. Thus, with a diff utility, it is possible to determine what is different between two documents. However, in many instances, the output of the diff utility is not very useful. One reason for this is that the test cases are often performed in different order on different platforms. As a result, in one document, the information pertaining to a particular test case may reside in one location of the document whereas in another document, the information pertaining to that same test case may reside in another location of the document. Since a diff utility does a literal, line-by-line comparison, it will specify that the two documents are different, even if the test results for the same test case in both documents are the same. This is clearly not the desired result. This is just one example of how a diff utility fails to generate the desired results. A diff utility has many other shortcomings that prevent it from being able to generate a useful overview of the test results.

Currently, there is no available mechanism that effectively compares content in multiple documents. As a result, the task of deriving the overview is performed manually, if at all. In some instances, the number of test cases can reach into the hundreds or even thousands, and the number of platforms can be as high as forty. Given such numbers, the task of manually generating the overview can be a very daunting and time-consuming one.

SUMMARY

In one embodiment of the present invention, there is provided a mechanism for automatically comparing content in a plurality of data structures. In one embodiment, this mechanism does not perform a literal, line-by-line comparison of the data structures. Instead, the mechanism first extracts the content from the data structures. The mechanism then substantively compares the extracted content. By extracting the content first and then substantively comparing the content, the mechanism eliminates the problems associated with a literal, line-by-line comparison of the data structures (such as location dependence, as discussed previously). As a result, the mechanism enables content comparison to be performed automatically, and enables improved comparison results to be achieved.

BRIEF DESCRIPTION OF THE DRAWINGS

FIG. 2 shows a portion of a sample XML document.

DETAILED DESCRIPTION OF EMBODIMENT(S)

Overview

Figure 1:
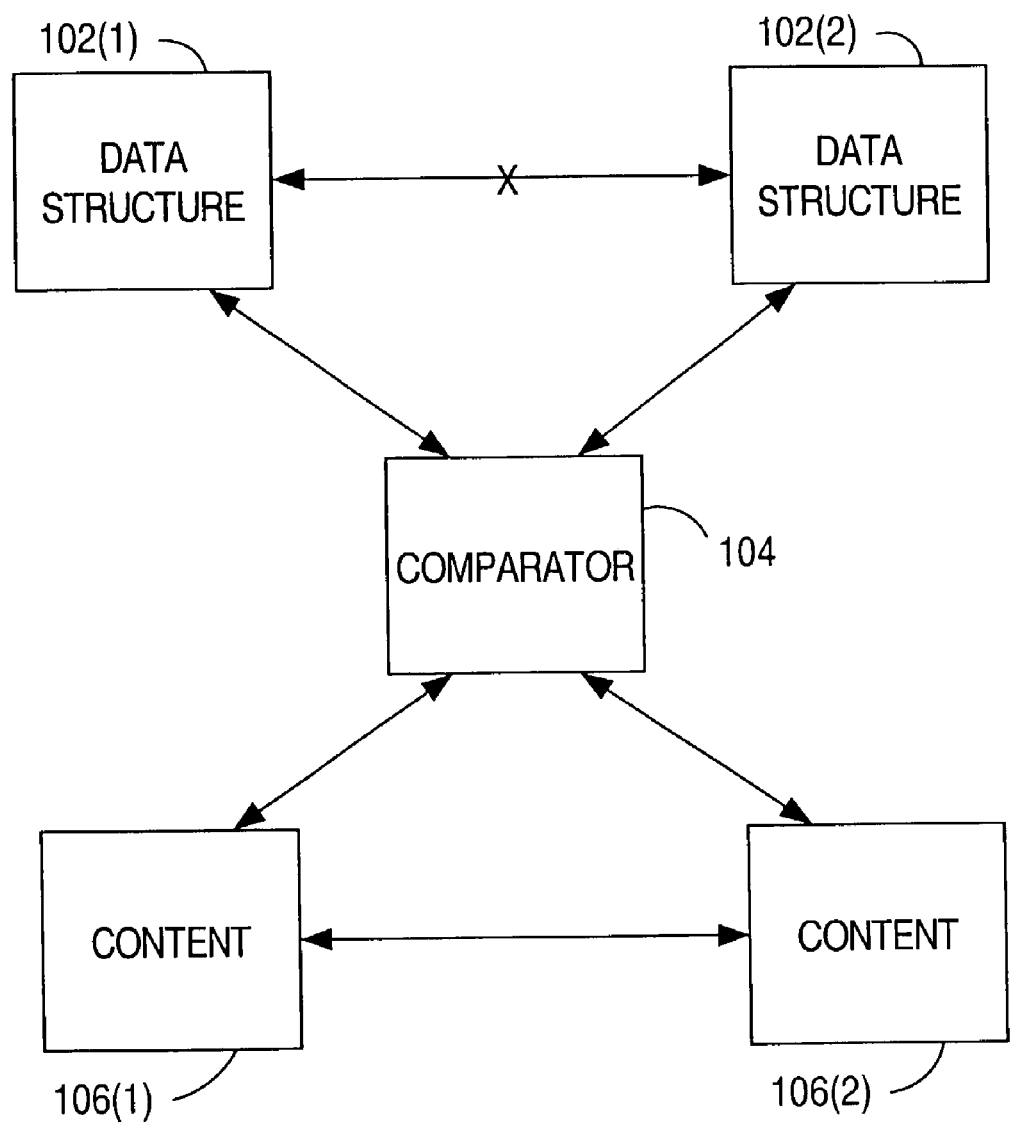
FIG. 1 is a functional block diagram, which provides an overview of a comparison approach implemented in accordance with one embodiment of the present invention.

With reference to FIG. 1, there is shown a functional block diagram, which provides an overview of a comparison approach implemented in accordance with one embodiment of the present invention. For the sake of simplicity, FIG. 1 shows just two data structures 102. However, it should be noted that the concepts taught herein may be applied to compare content in any number of data structures 102. As used herein, the term data structure refers broadly to any structure that contains information or data.

The data structures 102 are provided to the comparator 104. It is the function of the comparator 104 to compare the content in one data structure 102(1) with the content in the other data structure 102(2). In one embodiment, rather than taking the traditional approach of comparing the two data structures 102 directly using a literal, line-by-line methodology, the comparator 104 first extracts the content from both data structures 102. In the example of FIG. 1, comparator 104 extracts content 106(1) from data structure 102(1), and content 106(2) from data structure 102(2). Thereafter, the comparator 104 substantively compares the two sets of content 106(1), 106(2) to determine the differences therebetween. By extracting the content 106(1), 106(2) first and then substantively comparing the content 106(1), 106(2), comparator 104 circumvents the problems associated with a literal, line-by-line comparison of the data structures 102.

In one embodiment, each of the data structures 102 comprises a set of content and a set of descriptors (not shown). The set of content comprises one or more sets of information, and the descriptors describe and delimit the one or more sets of information in the content. The sets of information and the descriptors may take on many different forms. For example, the descriptors may be XML tags, and the sets of information may be information or data that are framed by the XML tags. For instance, in this portion of an XML document,

```
<Testcase>
    <TestID> 1 </TestID>
    <Status> Passed </Status>
</Testcase>
``` the descriptors would be the XML tags Testcase, TestID, and Status, and the sets of information would be the "1", and the "Passed". Together, the "1" and the "Passed" would constitute the overall content (or a part of the overall content). Where the descriptors are XML tags, the data structures 102 may be XML documents or files.

As an alternative to XML tags, the descriptors may be GML (General Markup Language) tags, SGML (Standard Generalized Markup Language) tags, HTML (Hypertext Markup Language) tags, or any other type of descriptor. Basically, anything that can describe and delimit one or more sets of information may serve as the descriptors. Using the descriptors as guides, the comparator 104 is able to extract the sets of information from the data structures 102, and to attach structure and significance to the extracted sets of information.

Comparator

Figure 3:
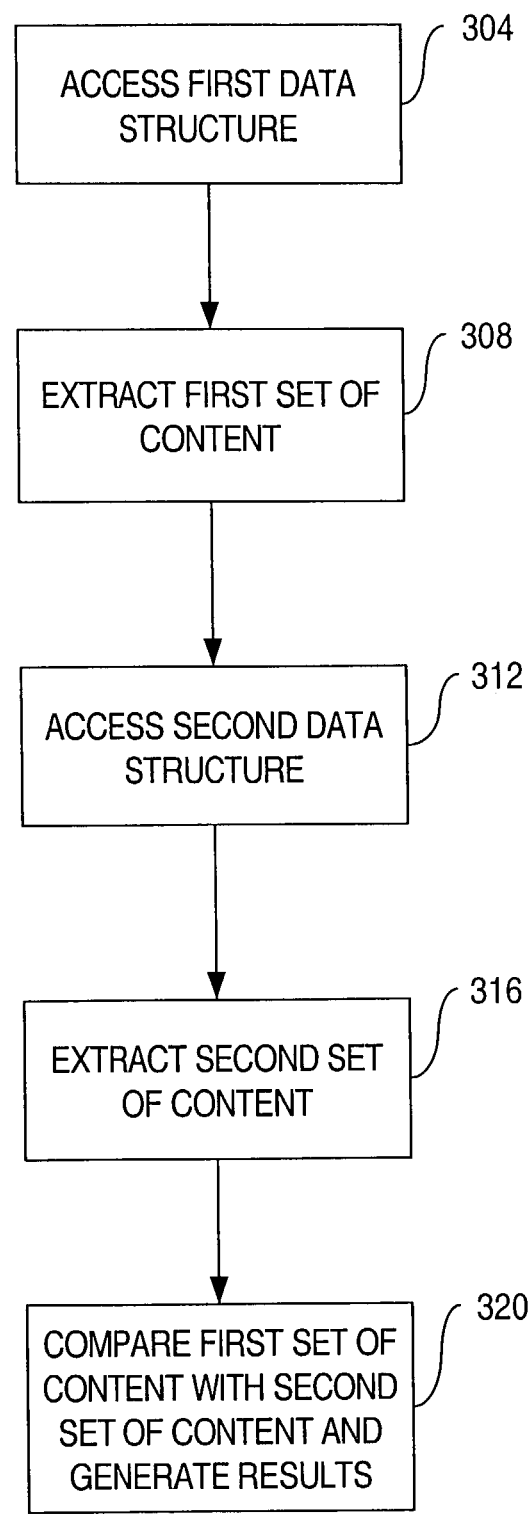
FIG. 3 is an operational flow diagram illustrating the operation of one embodiment of the comparator of FIG. 1.

To describe the comparator 104 in greater detail, reference will be made to an example. In the following example, it will be assumed that the data structures 102(1), 102(2) are XML documents. It will be further assumed that each XML document 102(1), 102(2) comprises the information shown in FIG. 2, wherein each document specifies a plurality of test cases with each test case having a test ID and a status. In the following example, no order will be assumed. That is, the test case with an ID value of "1" may be the first test case in one document 102, while the test case with the same ID value may be the last test case in the other document 102. Contrary to the literal, line-by-line comparison approach, the order and/or location of the test cases in the documents 102 does not affect the comparator's 104 results. With reference to this example, and to the flow diagram shown in FIG. 3, the operation of the comparator 104 in accordance with one embodiment of the present invention will now be described.

When called upon to compare the contents of multiple data structures, the comparator 104 initially accesses (block 304) a first data structure 102(1) (a first XML document in this example). It then extracts (block 308) from that document 102(1) a first set of content. In the current example, the comparator 104 extracts the first set of content as follows. Initially, it parses the XML document 102(1). In one embodiment, a well-known SAX (Simple API for XML) parser is used. As an alternative, a well-known DOM (Document Object Model) parser or any other XML parser may be used.

In parsing the XML document 102(1), the comparator 104 ascertains from the first set of Testcase tags (FIG. 2) that the information between the tags pertains to a particular test case. It then ascertains from the first set of TestID tags the ID value assigned to that test case. The comparator 104 thereafter ascertains from the first set of Status tags the status value associated with that test case. Thus, after parsing the first portion of the document 102(1), the comparator 104 obtains an ID value-status value pair. As the comparator 104 continues to parse the document 102(1), it will obtain additional ID value-status value pairs. When the entire document 102(1) has been parsed, the comparator 104 will have extracted all of the ID value-status value pairs (i.e. all of the sets of information) from the document 102(1). In this manner, a first set of content is extracted from the first document 102(1).

Figure 4:
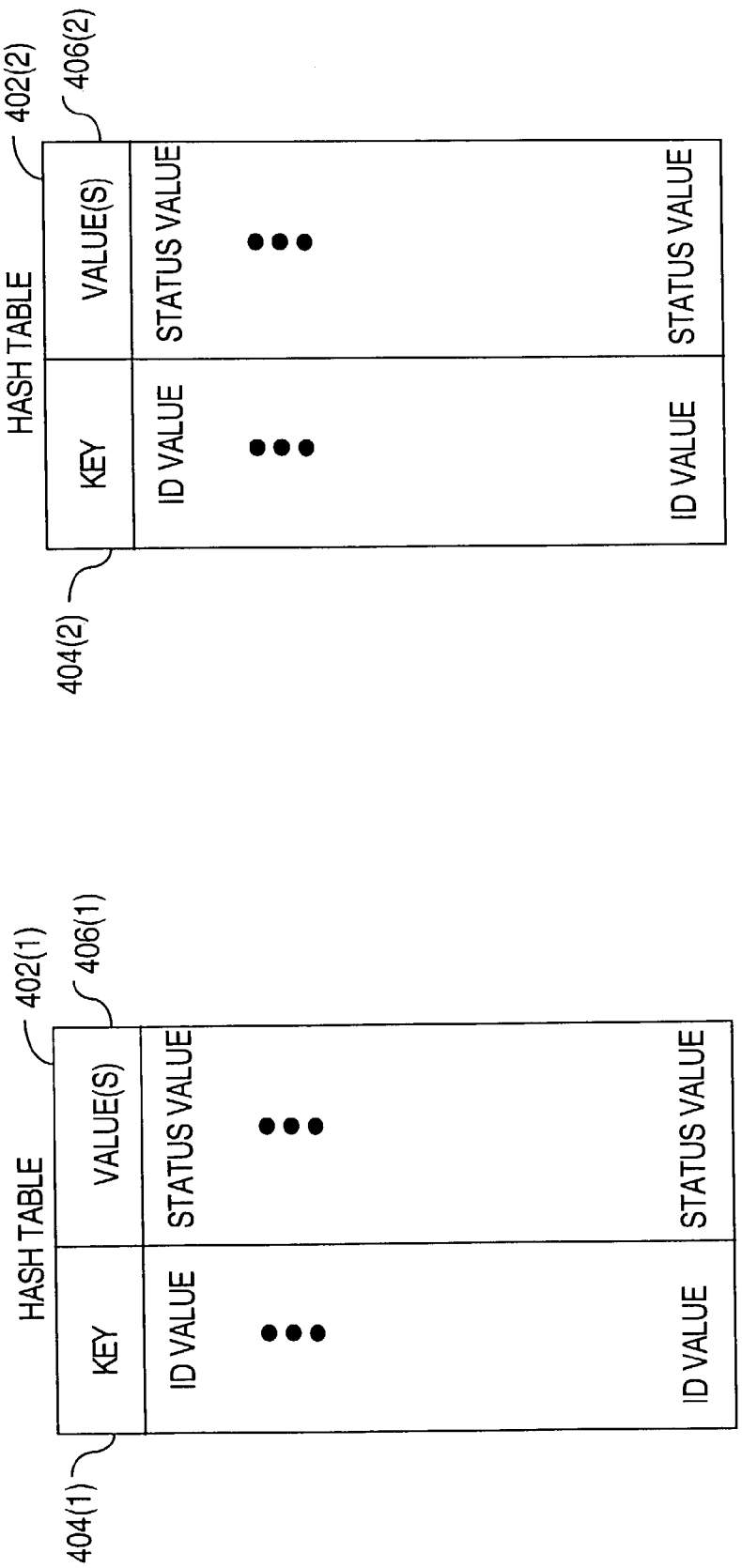
FIG. 4 shows two sample hash tables that may be created in accordance with one embodiment of the present invention.

In one embodiment, as the sets of information are extracted from the first document 102(1), they are stored into a first hash table 402(1) (FIG. 4). While not required, the use of a hash table 402(1) makes the sets of information quickly and easily accessible at a later time. In one embodiment, the ID value of an ID value-status value pair will be used as a key to access the value pair; thus, the ID value is stored into the key portion 404(1) of the hash table 402(1) while the status value is stored into the value(s) portion 406(1) of the hash table 402(1). In this example, there is only one value (a status value) associated with each ID value (each key value). However, it should be noted that, if so desired, multiple values may be associated with each key value. After all of the ID value-status value pairs extracted from the first document 102(1) are stored into the hash table 402(1), the extraction process for the first document 102(1) is completed.

Thereafter, the comparator 104 proceeds to access (block 312 of FIG. 3) a second data structure 102(2) (a second XML document in this example), and to extract (block 316) from that document 102(2) a second set of content. In one embodiment, the comparator 104 extracts the second set of content in substantially the same manner as it extracted the first set of content. Namely, the comparator 104 parses the second document 102(2), extracts the ID value-status value pairs therefrom, and stores the extracted value pairs into a second hash table 402(2). By the time the second set of content is extracted, two hash tables 402(1), 402(2) will have been created and populated. The information in these hash tables 402(1), 402(2) represent the content from the two documents 102(1), 102(2). Specifically, the information in hash table 402(1) represents the first set of content from the first document 102(1), and the information in has table 402(2) represents the second set of content from the second document 102(2). With the sets of content thus extracted, the comparator 104 is now ready to carry out the comparison process.

Initially, it should be noted that, in one embodiment, the comparator 104 compares just the sets of content. It does not compare the descriptors of one document 102(1) with the descriptors of the other document 102(2), nor does it compare the one data structure 102(1) with the other data structure 102(2).

In one embodiment, to carry out the comparison (block 320 of FIG. 3), the comparator 104 operates as follows. In the following discussion, the terms ID value and key will be used interchangeably since an ID value is used as a key to access an entry in the hash tables 402. Initially, the comparator 104 performs a union operation on the ID values (i.e. keys) of the two hash tables 402(1), 402(2). This union operation creates a superset of keys that includes all of the keys appearing in either hash table 402. In implementations where it is guaranteed that the same keys will appear in both hash tables 402(1), 402(2), this union operation may be omitted.

Thereafter, the comparator 104 selects a key. This key may be selected from the superset of keys if a union operation was performed, or it may be selected from one of the hash tables 402 if a union operation was not performed. The comparator 104 determines whether the selected key is missing from either one of the hash tables 402(1), 402(2). If so, then it is known that there is a difference between the two sets of contents. In such a case, the comparator 104 outputs information specifying the difference. This information may be outputted to a single data structure that contains all of the information pertaining to the comparison process, or it may be outputted to two separate data structures, with each data structure containing information pertaining to one of the hash tables 402. For example, there may be a first data structure pertaining to hash table 402(1), and a second data structure pertaining to hash table 402(2). If the selected key exists in hash table 402(2) but not in hash table 402(1), the comparator 104 may insert into the first data structure "Missing key (name of key)" and into the second data structure "First hash table does not have key (name of key)". Where a single data structure is used, the comparator 104 may insert into the data structure "First hash table does not have key (name of key) that exists in second hash table". The information inserted into the one or more data structures may be in any desired format (e.g. text, HTML, etc.).

If the selected key is not missing from either hash table 402(1), 402(2), the comparator 104 accesses a matching key in the first hash table 402(1) and obtains the status value associated with that matching key. Likewise, the comparator 104 accesses a matching key in the second hash table 402(2) and obtains the status value associated with that matching key. The comparator 104 then compares the two status values. In one embodiment, if the two values are the same, the comparator 104 does not output any information (however, if so desired, the comparator 104 may output information indicating that the values are the same). On the other hand, if the values are different, then the comparator 104 outputs information specifying the difference. Again, this information may be outputted to a single data structure or to two separate data structures. If key "1" has a status value of "Passed" in hash table 402(1) and a "Failed" status value in hash table 402(2), and if a single data structure is used, the comparator may insert into the data structure "Test 1 passed in first hash table and failed in second hash table". For the same example, if two data structures are used, the comparator 104 may insert into the data structure pertaining to the first hash table "Second hash table has inconsistent status for test 1; status value=passed", and insert into the data structure pertaining to the second hash table "First hash table has inconsistent status for test 1; status value=failed". The information inserted into the one or more data structures may be in any desired format (e.g. text, HTML, etc.).

After the comparison is performed and the difference information (if any) is outputted, the comparator 104 loops back to select another key and to repeat the comparison process. This continues until all keys have been selected and processed. At the end of this process, a complete set of comparison results will have been generated. The above example shows a comparison of just two sets of content. The same process may be applied to compare any number of sets of content. Thus, the generated results may represent, for example, an overview of a large set of test results. This overview may thereafter be reviewed easily by a user to derive valuable information therefrom.

Hardware Overview

Comparator 104 may be implemented using various technologies. For example, comparator 104 may be implemented using hardwired logic components, an application specific integrated circuit (ASIC), etc. Alternatively, comparator 104 may be implemented as one or more sets of instructions executable by one or more processors. In such a software implementation, comparator 104 may be implemented as part of an object oriented programming system, including but not limited to the JAVA™ programming system manufactured by Sun Microsystems, Inc. of Palo Alto, Calif.

Figure 5:
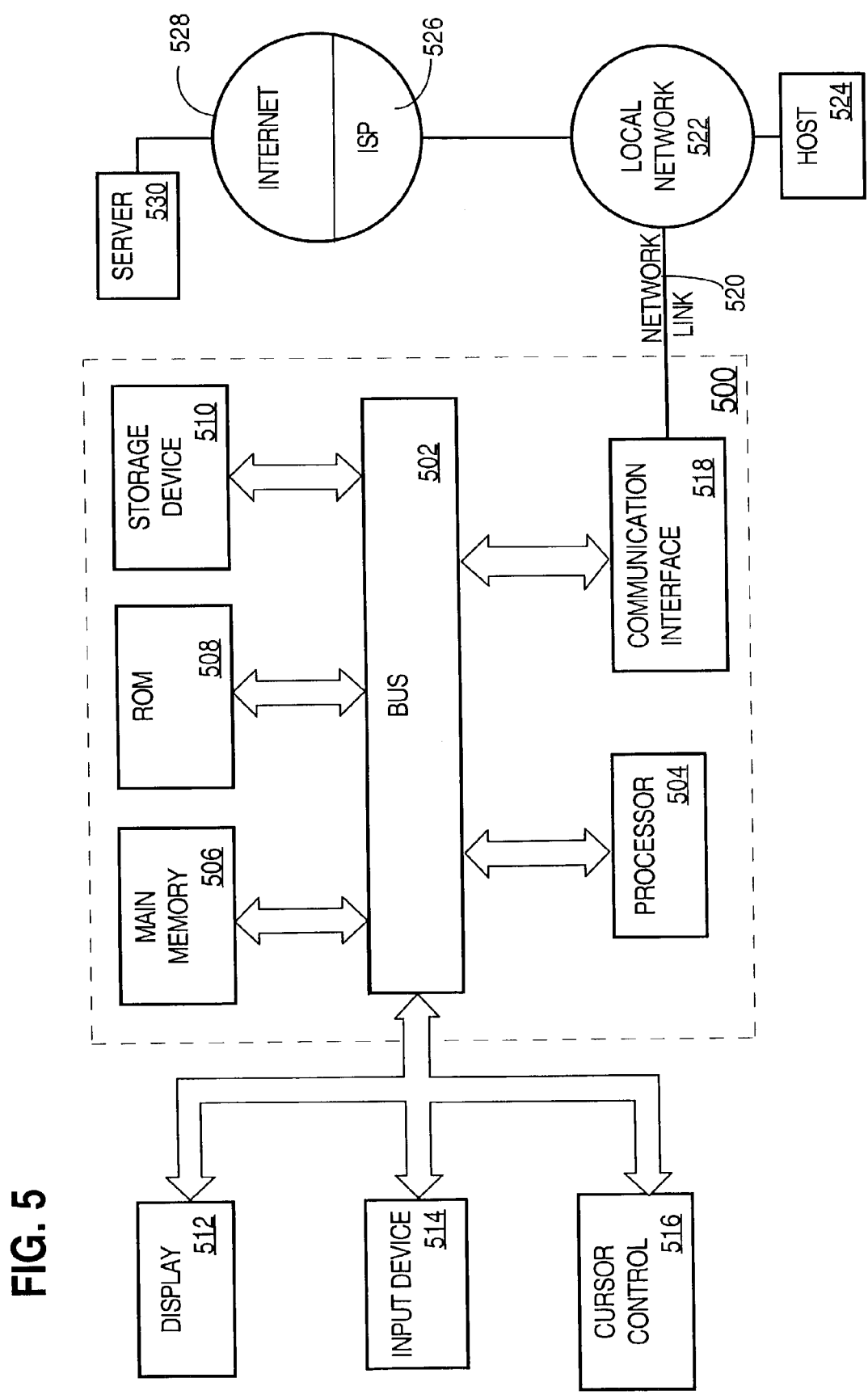
FIG. 5 is a hardware block diagram of a computer system in which one embodiment of the comparator of FIG. 1 may be executed.

FIG. 5 shows a hardware block diagram of a computer system 500 in which a software embodiment of the comparator 104 may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 may also be further used to store temporary variables or other intermediate information during execution of instructions by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

According to one embodiment, the functionality of the comparator 104 is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for comparing content, comprising:

extracting, from a first document, a first set of content, wherein the first set of content is described in the first document by a first set of descriptors, wherein the first set of content comprises a first set of keys and a first set of values, and wherein each of the first set of keys is associated with one or more of the first set of values, wherein the first set of keys are not XML (Extensible Markup Language) tags, and wherein the first set of values are not XML (Extensible Markup Language) tags;

creating a first data structure to store the first set of content, wherein the first data structure does not comprise the first set of descriptors;

extracting, from a second document, a second set of content, wherein the second set of content is described in the second document by a second set of descriptors, wherein the second set of content comprises a second set of keys and a second set of values, and wherein each of the second set of keys is associated with one or more of the second set of values, wherein the second set of keys are not XML (Extensible Markup Language) tags, and wherein the second set of values are not XML (Extensible Markup Language) tags;

creating a second data structure to store the second set of content, wherein the second data structure does not comprise the second set of descriptors;

after the first data structure and the second data structure are created, comparing the first set of values, stored in the first data structure, with the second set of values, stored in the second data structure, to determine any differences therebetween, wherein comparing comprises:

selecting a particular key of the first set of keys;

determining a first subset of values, in the first set of values, that are associated with the particular key;

determining a second subset of values, in the second set of values, that are associated with the particular key; and comparing the first subset of values with the second subset of values to determine any differences therebetween.

2. The method of claim 1, wherein said method is carried out without comparing the first set of descriptors with the second set of descriptors.

3. The method of claim 1, wherein said method is carried out without comparing the first document with the second document.

4. The method of claim 1, wherein comparing the first set of values with the second set of values comprises:
performing a union operation on the first set of keys and the second set of keys to derive a superset of keys.

5. The method of claim 4, wherein comparing the first set of values with the second set of values comprises:
selecting a selected key from the superset of keys;
determining whether the selected key is missing from the first set of keys; and
determining whether the selected key is missing from the second set of keys.

6. The method of claim 1, wherein the first set of descriptors comprises one or more tags for framing the first set of content, and wherein the second set of descriptors comprises one or more tags for framing the second set of content.

7. The method of claim 6, wherein the first set of descriptors and the second set of descriptors comprise XML (Extensible Markup Language) tags.

8. The method of claim 7, wherein the first data structure comprises a first hash table and wherein the second data structure comprises a second hash table.

9. The method of claim 1, wherein the first set of descriptors comprises one or more tags for framing the first set of content, and wherein extracting, the first set of content comprises:
parsing the first document to separate the first set of content from the first set of content from the first set of descriptors.

10. The method of claim 9, wherein the second set of descriptors comprises one or more tags for framing the second set of content, and wherein extracting the second set of content, and wherein extracting, from the second document, the second set of content comprises:
parsing the second document to separate the second set of content from the second set of descriptors.

11. The method of claim 10, wherein the first set of descriptors and the second set of descriptors comprise XML (Extensible Markup Language) tags.

12. The method of claim 11, wherein the first document comprises an XML document, and wherein the second document comprises an XML document.

13. An apparatus, comprising:
a processor:
means for extracting, from a first document, a first set of content, wherein the first set of content is described in the first document by a first set of descriptors, wherein the first set of content comprises a first set of keys and a first set of values, and wherein each of the first set of keys is associated with one or more of the first set of values,
wherein the first set of keys are not XML (Extensible Markup Language) tags, and wherein the first set of values are not XML (Extensible Markup Language) tags;
means for creating a first data structure to store the first set of content, wherein the first data structure does not comprise the first set of descriptors;
means for extracting, from a second document, a second set of content, wherein the second set of content is described in the second document by a second set of descriptors, wherein the second set of content comprises a second set of keys and a second set of values, and wherein each of the second set of keys is associated with one or more of the second set of values,
wherein the second set of keys are not XML (Extensible Markup Language) tags, and wherein the second set of values are not XML (Extensible Markup Language) tags;
means for creating a second data structure to store the second set of content, wherein the second data structure does not comprise the second set of descriptors;
means for comparing the first set of values, stored in the first data structure, with the second set of values, stored in the second data structure, to determine any differences therebetween after the first data structure and the second data structure are created, wherein the means for comparing the first set of values and the second set of values comprises:
means for selecting a particular key of the first set of keys;
means for determining a first subset of values, in the first set of values, that are associated with the particular key;
means for determining a second subset of values, in the second set of values, that are associated with the particular key; and
means for comparing the first subset of values with the second subset of values to determine any differences therebetween.

14. The apparatus of claim 13, wherein said apparatus compares the first and second sets of content without comparing the first set of descriptors with the second set of descriptors.

15. The apparatus of claim 13, wherein said apparatus compares the first and second sets of content without comparing the first document with the second document.

16. The apparatus of claim 13, wherein the means for comparing the first set of values with the second set of values comprises:
means for performing a union operation on the first set of keys and the second set of keys to derive a superset of keys.

17. The apparatus of claim 16, wherein the means for comparing the first set of values with the second set of values comprises:
means for selecting a selected key from the superset of keys;
means for determining whether the selected key is missing from the first set of keys; and
means for determining whether the selected key is missing from the second set of keys.

18. The apparatus of claim 13, wherein the first set of descriptors comprises one or more tags for framing the first set of content, and wherein the second set of descriptors comprises one or more tags for framing the second set of content.

19. The apparatus of claim 18, wherein the first set of descriptors and the second set of descriptors comprise XML (Extensible Markup Language) tags.

20. The apparatus of claim 19, wherein the first data structure comprises a first hash table, and wherein the second data structure comprises a second hash table.

21. The apparatus of claim 13, wherein the first set of descriptors comprises one or more tags for framing the first set of content, and wherein the means for extracting, from the first document, the first set of content comprises:
means for parsing the first document to separate the first set of content from the first set of descriptors.

22. The apparatus of claim 21, wherein the second set of descriptors comprises one or more tags for framing the second set of content, and wherein the means for extracting, from the second document, the second set of content comprises:

means for parsing the second document to separate the second set of content from the second set of descriptors.

23. The apparatus of claim 22, wherein the first set of descriptors and the second set of descriptors comprise XML (Extensible Markup Language) tags.

24. The apparatus of claim 23, wherein the first document comprises an XML document, and wherein the second document comprises an XML document.

25. A computer readable storage medium storing a set of instructions, the set of instructions comprising:

instructions for extracting, from a first document, a first set of content, wherein the first set of content is described in the first document by a first set of descriptors, wherein the first set of content comprises a first set of keys and a first set of values, and wherein each of the first set of keys is associated with one or more of the first set of values, wherein the first set of keys are not XML (Extensible Markup Language) tags, and wherein the first set of values are not XML (Extensible Markup Language) tags;

instructions for creating a first data structure to store the first set of content, wherein the first data structure does not comprise the first set of descriptors;

instructions for extracting, from a second document, a second set of content, wherein the second set of content is described in the second document by a second set of descriptors, wherein the second set of content comprises a second set of keys and a second set of values, and wherein each of the second set of keys is associated with one or more of the second set of values, wherein the second set of keys are not XML (Extensible Markup Language) tags, and wherein the second set of values are not XML (Extensible Markup Language) tags;

instructions for creating a second data structure to store the second set of content, wherein the second data structure does not comprise the second set of descriptors;

instructions for comparing, after the first data structure and the second data structure are created, the first set of values, stored in the first data structure, with the second set of values, stored in the second data structure, to determine any differences therebetween, wherein the instructions for comparing the first set of values and the second set of values comprises:

instructions for selecting a particular key of the first set of keys;

instructions for determining a first subset of values, in the first set of values, that are associated with the particular key;

instructions for determining a second subset of values, in the second set of values, that are associated with the particular key; and instructions for comparing the first subset of values with the second subset of values to determine any differences therebetween.

26. The computer readable storage medium of claim 25, wherein the first set of content is compared with the second set of content without comparing the first set of descriptors with the second set of descriptors.

27. The computer readable storage medium of claim 25, wherein the first set of content is compared with the second set of content without comparing the first document with the second document.

28. The computer readable storage medium of claim 25, wherein the instructions for comparing the first set of values with the second set of values comprises:

instructions for causing one or more processors to perform a union operation on the first set of keys and the second set of keys to derive a superset of keys.

29. The computer readable storage medium of claim 28, wherein the instructions for comparing the first set of values with the second set of values comprises:

instructions for causing one or more processors to select a selected key from the superset of keys;

instructions for causing one or more processors to determine whether the selected key is missing from the first set of keys; and instructions for causing one or more processors to determine whether the selected key is missing from the second set of keys.

30. The computer readable storage medium of claim 25, wherein the first set of descriptors comprises one or more tags for framing the first set content, and wherein the second set of descriptors comprises one or more tags for framing the second set of content.

31. The computer readable storage medium of claim 30, wherein the first set of descriptors and the second set of descriptors comprise XML (Extensible Markup Language) tags.

32. The computer readable medium of claim 31, wherein the first data structure comprises a first hash table, and wherein the second data structure comprises a second hash table.

33. The computer readable storage medium of claim 25, wherein the first set of descriptors comprises one or more tags for framing the set of content, and wherein the instructions for causing one or more processors to extract, from the first document, the first set of content comprises:

instructions for causing one or more processors to parse the first document to separate the first set of content from the first set of descriptors.

34. The computer readable storage medium of claim 33, wherein the second set of descriptors comprises one or more tags for framing the second second set of content, and wherein the instructions for causing one or more processors to extract, from the second document, the second set of content comprises:

instructions for causing one or more processors to parse the second document to separate the second set of content from the second set of descriptors.

35. The computer readable storage medium of claim 34, wherein the first set of descriptors and the second set of descriptors comprise XML (Extensible Markup Language) tags.

36. The computer readable storage medium of claim 35, wherein the first document comprises an XML document, and wherein the second document comprises an XML document.

* * * * *

UNITED STATES PATENT AND TRADEMARK OFFICE
CERTIFICATE OF CORRECTION

PATENT NO. : 7,353,225 B2  Page 1 of 1
APPLICATION NO. : 10/294713
DATED : April 1, 2008
INVENTOR(S) : Aditya Dada It is certified that error appears in the above-identified patent and that said Letters Patent is hereby corrected as shown below:

COLUMN 9
Lines 4 and 5, delete "the first set of values with the second set of values"

Lines 8 and 9, delete "the first set of values with the second set of values"

Line 28, after "extracting," insert --from the first document--

Line 31, delete "from the first set of content"

Lines 35 and 36, delete "and wherein extracting the second set of content,"

COLUMN 10
Lines 36 and 37, delete "the first set of values with the second set of values"

Lines 42 and 43, delete "the first set of values with the second set of values"

COLUMN 12
Lines 8 and 9, replace "comparing the first set of values with the second set of values" with --causing one or more processors to compare--

Lines 14 and 15, replace "comparing the first set of values with the second set of values" with --causing one or more processors to compare--

Line 33, after "readable" insert --storage--

Line 39, after "framing the" insert --first--

Signed and Sealed this

Sixth Day of January, 2009

JON W. DUDAS
*Director of the United States Patent and Trademark Office*